(12) United States Patent
Thorngren et al.

(10) Patent No.: US 11,214,194 B2
(45) Date of Patent: Jan. 4, 2022

(54) VEHICLE COMPRISING A DOOR OPENING WARNING SYSTEM

(71) Applicant: Ningbo Geely Automobile Research & Development Co., Ltd., Ningbo (CN)

(72) Inventors: Mats Thorngren, Gothenburg (SE); Max Olle Cavallin, Gothenburg (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 17/122,639

(22) Filed: Dec. 15, 2020

(65) Prior Publication Data

US 2021/0101529 A1 Apr. 8, 2021

Related U.S. Application Data

(63) Continuation of application No. PCT/CN2019/094238, filed on Jul. 1, 2019.

(30) Foreign Application Priority Data

Jul. 10, 2018 (EP) .................................... 18182650

(51) Int. Cl.
*B60Q 9/00* (2006.01)
*B60Q 1/52* (2006.01)
(Continued)

(52) U.S. Cl.
CPC ............. *B60Q 9/008* (2013.01); *B60Q 1/525* (2013.01); *B60Q 5/006* (2013.01); *E05B 81/56* (2013.01); *E05B 85/10* (2013.01)

(58) Field of Classification Search
CPC ........ B60Q 9/008; B60Q 1/525; B60Q 5/006; B60Q 9/006; E05B 85/10; E05B 81/56;
(Continued)

(56) References Cited

U.S. PATENT DOCUMENTS 5,760,708 A * 6/1998 Seith ..................... G01S 13/931
340/903
9,637,965 B1 * 5/2017 Kothari .................. B60J 5/0493
(Continued)

FOREIGN PATENT DOCUMENTS

| CN | 106004754 A | 10/2016 |
|---|---|---|
| CN | 207128572 U | 3/2018 |

(Continued)

OTHER PUBLICATIONS

International Search Report from corresponding International Application No. PCT/CN2019/094238, dated Oct. 9, 2019, 2 pages.

*Primary Examiner* — Brian E Miller
(74) *Attorney, Agent, or Firm* — Tucker Ellis LLP (57) ABSTRACT

A vehicle includes a door, an inside door handle, and a door opening warning system having an object sensor that detects an object outside the vehicle in a door collision risk zone, a touchless sensor that detects if a part of a user is positioned in an opening zone at the inside door handle and a touch sensor that detects if the user touches the inside door handle, and a control unit. The control unit triggers a first alarm if the object sensor detects an object in the risk zone and the touchless sensor detects a part of the user in the opening zone at the inside door handle, and triggers a second alarm if the object sensor detects an object in the risk zone and the touch sensor detects that the user is touching the inside door handle.

18 Claims, 5 Drawing Sheets

(51) Int. Cl.
*E05B 81/56* (2014.01)
*E05B 85/10* (2014.01)
*B60Q 5/00* (2006.01)

(58) Field of Classification Search
CPC ......... E05B 81/64; E05B 77/54; B66B 1/468;
B66B 2201/4684; B66B 2201/4653;
B60R 25/1004; G07C 9/00174
See application file for complete search history.

(56) References Cited

U.S. PATENT DOCUMENTS

| | | | | |
|---|---|---|---|---|
| 9,725,038 | B2* | 8/2017 | Wu | B60Q 9/008 |
| 9,845,048 | B1* | 12/2017 | Tseng | G07C 9/00174 |
| 10,026,319 | B2* | 7/2018 | Wu | B60R 1/007 |
| 10,049,580 | B1* | 8/2018 | Wu | E05B 85/16 |
| 10,060,170 | B2* | 8/2018 | Gomez Melchor | B60J 5/0493 |
| 10,086,833 | B1* | 10/2018 | Duan | G01S 15/87 |
| 10,183,640 | B2* | 1/2019 | Rhode | E05F 15/622 |
| 10,435,920 | B2* | 10/2019 | Ganeshan | E05C 17/006 |
| 10,532,738 | B2* | 1/2020 | Yoo | B60R 1/12 |
| 10,726,812 | B2* | 7/2020 | Helot | G09G 5/37 |
| 10,754,021 | B2* | 8/2020 | Baheti | G01S 13/584 |
| 2005/0168331 | A1* | 8/2005 | Gunderson | G01S 15/931 |
| | | | | 340/468 |
| 2005/0280518 | A1* | 12/2005 | Bartels | B60Q 1/2665 |
| | | | | 340/435 |
| 2006/0056086 | A1* | 3/2006 | Hannah | B60Q 1/2665 |
| | | | | 359/843 |
| 2008/0218381 | A1* | 9/2008 | Buckley | B60Q 1/50 |
| | | | | 340/932.2 |
| 2008/0238636 | A1* | 10/2008 | Birging | B60R 25/33 |
| | | | | 340/426.1 |
| 2009/0322501 | A1* | 12/2009 | Haberland | B60Q 9/008 |
| | | | | 340/435 |
| 2013/0060429 | A1* | 3/2013 | Kim | B60K 28/12 |
| | | | | 701/48 |
| 2013/0169425 | A1* | 7/2013 | Victor | G08G 1/162 |
| | | | | 340/435 |
| 2014/0098230 | A1* | 4/2014 | Baur | B60R 16/0232 |
| | | | | 348/148 |
| 2014/0297173 | A1* | 10/2014 | Li | G08G 1/166 |
| | | | | 701/301 |
| 2014/0309849 | A1* | 10/2014 | Ricci | G01C 21/26 |
| | | | | 701/33.4 |
| 2014/0310186 | A1* | 10/2014 | Ricci | G01S 19/42 |
| | | | | 705/302 |
| 2015/0330111 | A1* | 11/2015 | Dente | H02J 7/00 |
| | | | | 701/49 |
| 2016/0023600 | A1* | 1/2016 | Okamoto | B60Q 9/00 |
| | | | | 340/435 |
| 2016/0208537 | A1* | 7/2016 | Senguttuvan | E05F 15/73 |
| 2017/0169703 | A1* | 6/2017 | Carrasco | G08G 1/005 |
| 2017/0210282 | A1* | 7/2017 | Rodriguez Barros | B60Q 1/484 |
| 2017/0218678 | A1* | 8/2017 | Kothari | B60Q 1/323 |
| 2018/0001890 | A1* | 1/2018 | Ratcliffe | B60W 30/095 |
| 2018/0081357 | A1* | 3/2018 | Datta Gupta | G05D 1/021 |
| 2018/0233048 | A1* | 8/2018 | Andersson | B60W 40/04 |
| 2019/0211587 | A1* | 7/2019 | Ganeshan | B60R 21/0153 |
| 2019/0259283 | A1* | 8/2019 | Sung | G01S 7/003 |

FOREIGN PATENT DOCUMENTS

| | | |
|---|---|---|
| CN | 107963019 A | 4/2018 |
| CN | 107985194 A | 5/2018 |
| DE | 102005014581 A1 | 9/2006 |
| DE | 102014010654 A1 | 1/2015 |
| GB | 2505763 A | 3/2014 |
| WO | 2014198803 A1 | 12/2014 |

* cited by examiner

VEHICLE COMPRISING A DOOR OPENING WARNING SYSTEM

RELATED APPLICATION DATA

This application is a continuation of International Patent Application No. PCT/CN2019/094238, filed Jul. 1, 2019, which claims the benefit of European Patent Application No. 18182650.4, filed Jul. 10, 2018, the disclosures of which are incorporated herein by reference in their entireties.

TECHNICAL FIELD

The present invention relates to the field of vehicles. A vehicle uses a variety of techniques to detect its surroundings, such as radar, laser light, GPS, odometer, and computer vision. A door opening warning function in a vehicle detects objects in the surroundings of the vehicle that may collide with the vehicle upon opening the vehicle door(s) from the inside.

BACKGROUND

A door opening warning function will beep a sound or flash a light if there is a moving object outside the car that may hit an opening door when the door is opened. Even if a vehicle is equipped with a door opening warning function accidents does however still occur, when the vehicle doors are opened and objects crash into the door. There is thus a need to even further reduce the risk of that these types of accidents occur. There is also a need to reduce the risk of false alarms, so that the user of a vehicle will pay attention to a door opening warning function and not disregard it due to prior false alarms. There is also a need to reduce the total number of alarms and to only set off an alarm when there is an actual risk of a collision, so that the user of a vehicle will pay attention to the door opening warning function and not disregard it due to that the alarm are activated too often. There is also a need to increase the chance of that other users than the driver of the vehicle perceives the alarm and act on it.

SUMMARY

It is known in the art that a door opening warning function of a vehicle will set off an alarm when it detects an object is near the vehicle by flashing a lamp or send out a sound.

An object of the present invention is to provide a method and a device, which seek to mitigate, alleviate, or eliminate one or more of the above-identified deficiencies in the art and disadvantages singly or in any combination.

The inventors have identified that there is a need for the user (driver and passengers) of the vehicle to be able to be warned if an object is detected that risks to collide with the vehicle door if it is opened and at the same time not set of an alarm to often so that the user will ignore the alarm. In addition to this, there is also a need for a system that is able to override the intention of the user to open the vehicle door if there is a risk of that an object will collide with the door if the door is opened.

In this disclosure, a solution to the problem outlined above is proposed. In the proposed solution, a vehicle comprising at least one door, moveable between an open and closed position and comprising at least one inside door handle for opening the door, and a door opening warning system comprising at least one object sensor configured to detect an object outside the vehicle in a risk zone in which there is a risk of that the object collision with the door if it is moved from the closed position to the open position, a touchless sensor configured to detect if a part of a user is positioned in an opening zone at the inside door handle and a touch sensor configured to detect if the user touch the inside door handle, and a control unit connected to the at least one object sensor, the touchless sensor and the touch sensor.

The control unit of the door opening warning system is configured to trigger a first alarm if the object sensor detect an object in the risk zone and the touchless sensor detects a part of the user in the opening zone at the inside door handle.

The control unit of the door opening warning system is configured to trigger a second alarm if the object sensor detect an object in the risk zone and the touch sensor detects that the user is touching the inside door handle.

By having two different alarms, the door opening warning system of the vehicle may inform the user of a vehicle based on the risk of a collision. If the user of the vehicle approaches the door handle to open the door and the system detects an object in the risk zone the user will be informed of this by the first alarm. However, if the user ignores or for some reason do not perceive the alarm and proceed with the intention to open the door and moves the hand further towards the door handle and actually touches the handle, the door opening warning system will trigger a second alarm. The risk of a collision is higher when there is an object in the risk zone and the user touches the door handle and the second alarm may be different from the first alarm to increase the possibility that the user detects it and realize that there is a risk and cancels the process of opening the door.

Further, by having two different alarms the chance of that the users of the vehicle observes the alarms increases and the risk of that a collision occurs is reduced.

According to an aspect the control unit is connected to at least one lamp and configured to turn on or flash the lamp if the first alarm is triggered and turn on or flash the lamp in a more intense way if the second alarm is triggered. A more intense way is here intended to mean that the lamp is blinked faster and/or that the brightness of the light is increased.

According to an aspect the control unit is connected to at least one speaker and configured to emit a sound via the speaker if the first alarm is triggered and to emit a more intense sound if the second alarm is triggered. A more intense way is here intended to mean that the volume of sound is increased, that the frequency of the sound is changed or that the sound is changed.

According to an aspect the control unit is connected to and configured to turn on a vibration unit of the vehicle when the first and/or second alarm is triggered. According to an aspect the control unit is connected to and configured to turn on a heads up display of the vehicle when the first and/or second alarm is triggered. According to an aspect the control unit is connected to and configured to turn on an electric shock unit of the vehicle when the first and/or second alarm is triggered. By setting of an electric shock the user will automatically, as a natural reaction to the shock, move the hand away from the inside door handle. According to an aspect the control unit is connected to and configured to turn on a lock of the vehicle door when the first and/or second alarm is triggered. By locking the door, the user is informed of the risk of a collision and actually restricted to open the door.

According to an aspect the door opening warning system is configured to be in an active state when the vehicle is standing still and in a deactivated state when the vehicle is moving. By this the system only is active when it is needed and the energy consumption of the system is reduced.

According to an aspect the door opening warning system is configured to be in the active state for a predefined period of time after the vehicle has stopped moving and/or after the vehicle has been turned off. By this, the system only is active when it is needed and the energy consumption of the system is reduced.

According to an aspect the inside door handle is positioned at a cavity and the touchless sensor is configured to detect if a part of the user is inserted into the cavity.

According to an aspect the touchless sensor is one or more of a camera, a radar, a IR sensor, a ultrasonic sensor or a laser.

According to an aspect the touch sensor is one or more of a camera, a capacitive sensor or a receptive sensor.

According to an aspect the object sensor is one or more of a camera, radar, IR-sensor, a ultrasonic sensor and a laser.

According to an aspect the at least one lamp is positioned at the inside door handle, in the inside door handle, at a doorpost, at a post, at a rear view mirror, at a side mirror and/or at a ceiling lamp of the vehicle.

According to an aspect the at least one speaker is a speaker of a hi-fi-system of the vehicle.

According to an aspect the risk zone is at least the area on the outside of the vehicle above which the door moves from its open and closed position.

According to an aspect the risk zone is at least the area on the outside of the vehicle at an area behind the vehicle.

According to an aspect the control unit is configured to identify different types of objects identified by the object sensor and configured to regulate the size of the risk zone based on the type of the identified object. By regulating the risk zone based on the object identified, the risk of triggering the alarm in situations where there are no risk is reduced. If for instance a bicycle is identified, then it is ok if it is located 100 m behind the vehicle and the risk is low for a collision if the door is opened, however, if a car is identified and is located 100 m behind the vehicle the risk of a collision is rather high if the door is opened.

In another aspect of the invention, a method for operating the vehicle according to the above is disclosed. The method comprising the steps of detecting, by the object sensor, if an object is in the risk zone, detecting, by the touchless sensor, if a part of a user is in the opening zone at inside door handle, detecting, by the touch sensor, if the user is touching the inside door handle, triggering a first alarm, if the object sensor detect an object in the risk zone and the touchless sensor detects that the user is in the opening zone at the inside door handle, and triggering a second alarm if the object sensor detect an object in the risk zone and the touch sensor detects that the user is touching the inside door handle.

According to an aspect the door opening warning system is activated when the vehicle has stopped moving.

According to an aspect the door opening warning system is deactivated after a predefined period of time after the vehicle has stopped moving.

According to an aspect the control unit of the door opening warning system is configured to trigger a third alarm if the object sensor detect an object in the risk zone and the inside door handle is moved.

According to an aspect the third alarm comprise locking the door such that it cannot be moved into the risk zone.

Generally, all terms used in the claims are to be interpreted according to their ordinary meaning in the technical field, unless explicitly defined otherwise herein. All references to "a/an/the [element, device, component, means, etc.]" are to be interpreted openly as referring to at least one instance of said element, device, component, means, etc., unless explicitly stated otherwise. Further, by the term "comprising" it is meant "comprising but not limited to" throughout the application.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments and aspects.

DETAILED DESCRIPTION

The present invention will now be described more fully hereinafter with reference to the accompanying drawings, in which exemplary embodiments and aspects of the invention are shown. The invention may, however, be embodied in many different forms and should not be construed as limited to the embodiments and aspects set forth herein; rather, these embodiments and aspects are provided for thoroughness and completeness. Like reference characters refer to like elements throughout the description. The drawings are not necessarily to scale and certain features may be exaggerated in order to better illustrate and explain the exemplary embodiments of the present invention.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In some implementations and according to some aspects of the disclosure, the functions or steps in the method can occur out of the order noted in the operational illustrations. For example, two steps shown in succession can in fact be executed substantially concurrently or the steps can sometimes be executed in the reverse order, depending upon the functionality/acts involved.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Although the invention will be described in relation to a car, the invention is not restricted to this particular vehicle, but may as well be installed in other type of vehicles such as minivans, recreational vehicles, off-road vehicles, trucks, buses or the like.

Figure 1:
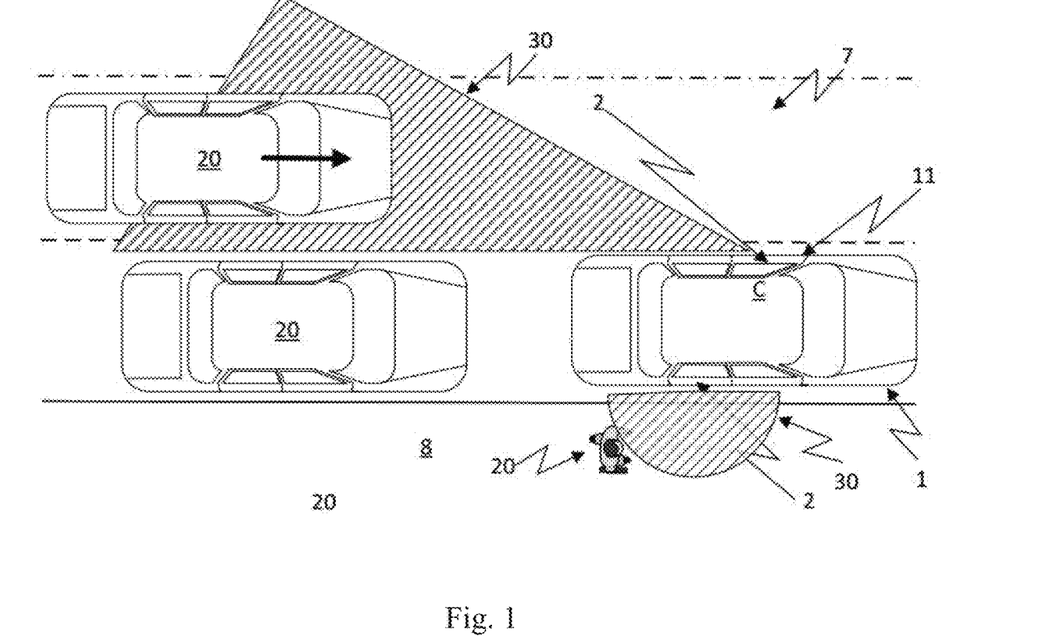
FIG. 1 discloses a schematic view of a vehicle according to the invention parked in a street and two objects in the form of cars and an object in the form of a person.

In FIG. 1, to which now is referred to, disclose schematic view of vehicle 1 according to the invention parked in a street 7 and two objects 20 in the form of cars and one object 20 in the form of a person walking on a sidewalk 8.

The vehicle 1 comprises at least one door 2 and a door opening warning system 10.

Figure 2:
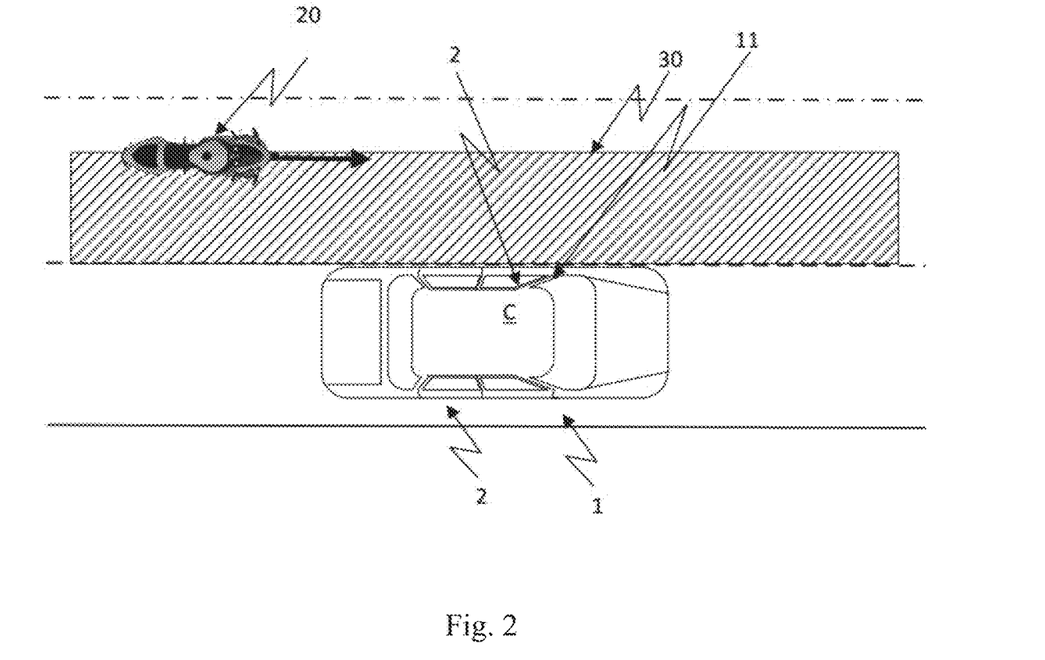
FIG. 2 discloses a schematic view of a vehicle according to the invention parked in a street and an object in the form of a motorcycle.

The door 2 is accordance with an aspect the front door 2 of the vehicle 1. According to an aspect the door 2 is a passenger door 2 of the vehicle 1. The door 2 is moveable between a closed position C (as disclosed in FIGS. 1 and 2) and an open position O (as disclosed in FIG. 3).

Figure 8:
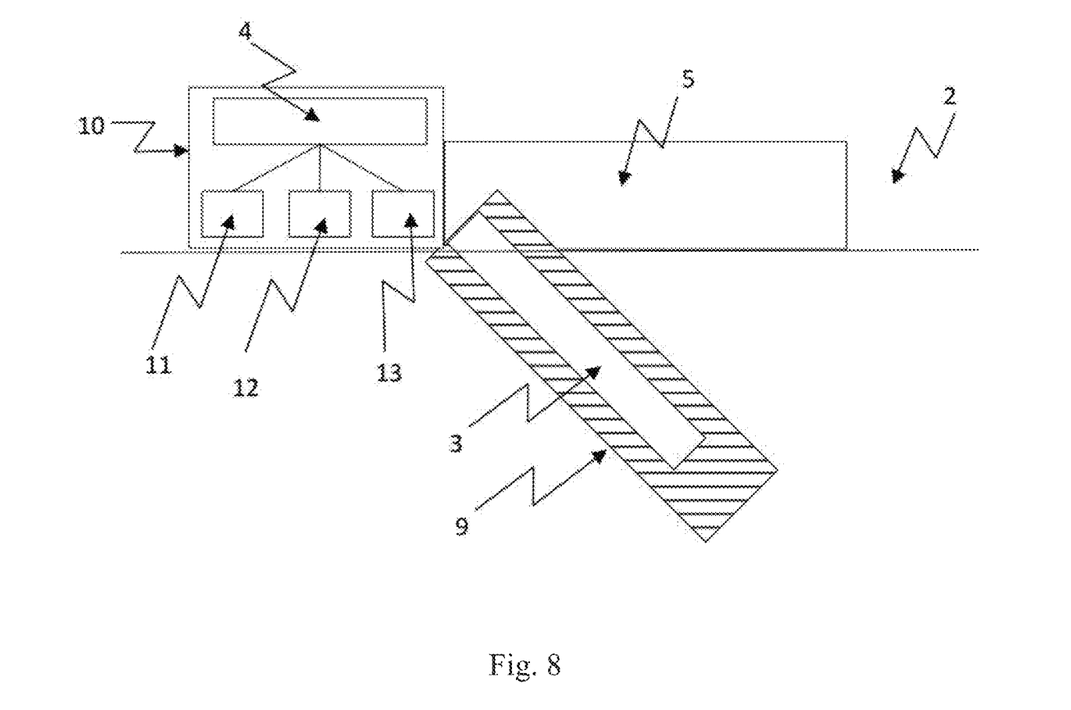
FIG. 8 discloses a schematic cross sectional view of an inside door handle in an open position and part of a door of a vehicle according to the invention.

The door 2 comprises at least one inside door handle 3 for opening the door 2. The inside door handle 3 is moveably between a first position (as disclosed in FIGS. 4-7) and a second position (as disclosed in FIG. 8) to unlock a lock 80, such that the door 2 is moveable between its closed and closed position O, C.

According to an aspect (as disclosed in FIG. 5-8) the inside door handle 3 is positioned at a cavity 5 in the door 2.

When the vehicle 1 has stopped and a user (a driver or a passenger) of the vehicle 1 opens the door 2, the user reaches for the inside door handle 3 and positions a part 50 (often one or more fingers) at the inside door handle 3. Thereafter the user grabs the inside door handle 3 and moves it from the first position to the second position to unlock the lock 80. Thereafter the door 2 is moved from the closed position C to the open position O.

The door opening warning system 10 is further disclosed in FIG. 5-8. The door opening warning system 10 is configured to detect/identify an object 20 and to trigger a first or a second alarm to inform the user of that there is a risk of a collision if the door 2 is opened. According to an aspect the door opening warning system 10 is configured to be in an active state, i.e. actively detect objects and notify the user, when the vehicle 1 is standing still and in a deactivated state when the vehicle 1 is moving. According to an aspect the door opening warning system 10 is configured to be in the active state for a predefined period of time after the vehicle 1 has stopped moving and/or after the vehicle 1 has been turned off. The door opening warning system 10 is according to an aspect connected to a battery, not disclosed, and is powered also after the vehicle 1 has been turned off. According to an aspect the door operating warning system 10 is configured to be in the active state for 1-3 minutes after the vehicle 1 has stopped moving. By stopped moving is meant that the vehicle is standing still. This is an indication of that the vehicle 1 has parked and that a user of the vehicle 1 is about to open a door 2.

Figure 3:
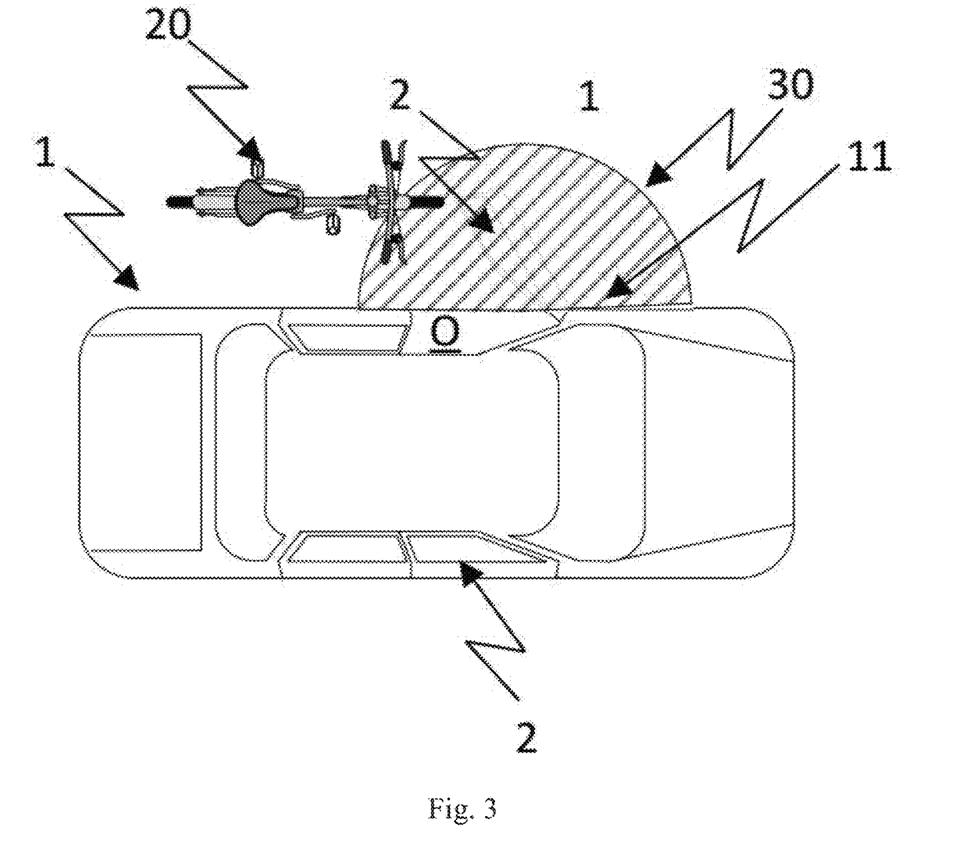
FIG. 3 discloses a schematic view of a vehicle according to the invention parked in a street and an object in the form of a bicycle.
Figure 4:
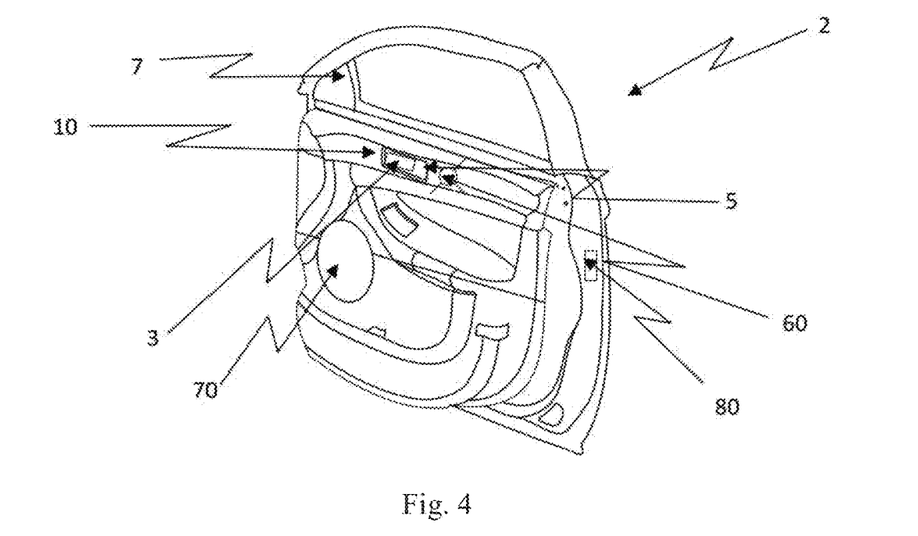
FIG. 4 discloses a schematic view of a door of a vehicle according to the invention.
Figure 5:
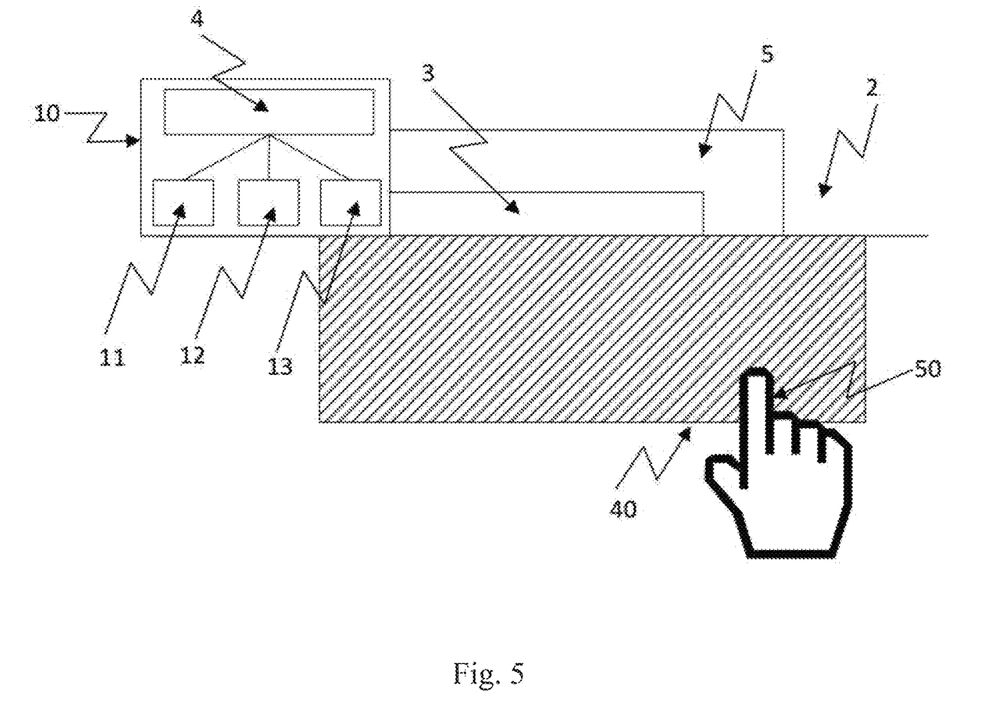
FIG. 5 discloses a schematic cross sectional view of an inside door handle and part of a door of a vehicle according to the invention and a part of a user in an opening zone.

According to an aspect the risk zone 30 is the area on the outside of the vehicle 1 above which the door 2 moves from its open O and closed position C, as disclosed in the lower part of FIG. 1 and in FIG. 3.

According to an aspect the risk zone 30 is the area on the outside of the vehicle 1 behind the vehicle 1. According to an aspect the risk zone 30 is a triangular shaped area 30, as disclosed in the upper part of FIG. 1. According to an aspect the risk zone 30 is a circular segment shaped area 30, as disclosed in the lower part of FIG. 1. According to an aspect the risk zone 30 is a rectangular shaped area 30, as disclosed in the FIG. 2. According to an aspect the risk zone 30 is an area extending backwards in view of the vehicle 1 from the door 2. According to an aspect the risk zone 30 is an area extending forward in view of the vehicle 1 from the door 2. According to an aspect the risk zone 30 is an area extending backwards and forward in view of the vehicle 1 from the door 2. According to an aspect the risk zone 30 is an area surrounding the vehicle 1. According to an aspect the risk zone 30 extends between 25-150 meters backwards from the rear of the vehicle 1. According to an aspect the risk zone 30 extends between 25-150 meters forward from the rear of the vehicle 1. According to an aspect the risk zone 30 extends between 5-15 meters sideways from the vehicle 1.

The door opening warning system 10 comprise at least a control unit 4 connected to at least one object sensor 11, a touchless sensor 12 and a touch sensor 13.

The object sensor 11 is configured to detect the object 20 outside the vehicle 1 in the risk zone 30. The risk zone 30 is a zone/area in which there is a risk of that the object 20 positioned in the risk zone 30 collide with the door 2 if the door 2 it is moved from the closed position C to the open position O. The object sensor 11 can be a part of an autonomous driving system of the vehicle 1 and be used to identify other objects for other purposes when the vehicle 1 is driving. According to an aspect the object sensor 11 is one or more of a camera, radar, IR-sensor, a ultrasonic sensor and a laser. According to an aspect the object sensor 11 is also used as rear camera for assisting when reversing the vehicle 1, a parking assistance system or a blind spot identification system. According to an aspect the object sensor 11 comprises two or more sensors. According to an aspect the object sensor 11 is positioned at one or more positions on the outside of the vehicle 1.

The touchless sensor 12 is configured to detect if a part 50 of a user is positioned in an opening zone 40 at the inside door handle 3. According to an aspect the opening zone 40 is a zone in front of the inside door handle 3, as disclosed in FIG. 4. According to an aspect is the opening zone 40 a zone in front of the inside door handle 3 that a part 50 of a user needs to enter before reaching the inside door handle 3. According to an aspect the opening zone 40 is rectangular, triangular or circular shaped. According to an aspect the opening zone 40 reaches between 5-20 cm from the inside door handle 3. The touchless sensor 12 is according to an aspect connected to the door 2, as disclosed in FIG. 4-8. According to an aspect the touchless sensor 12 is positioned in a dash board of the vehicle 1 or in a ceiling of the vehicle 1. According to an aspect the touchless sensor 12 is one or more of a camera, a radar, a IR sensor, a ultrasonic sensor or a laser. According to an aspect the touchless sensor 12 is also used as an interior camera, a driver monitor camera, a gesture control sensor. According to an aspect the touchless sensor 12 is configured to detect if the part 50 of the user is inserted into the cavity 5 at the inside door handle 3.

Figure 6:
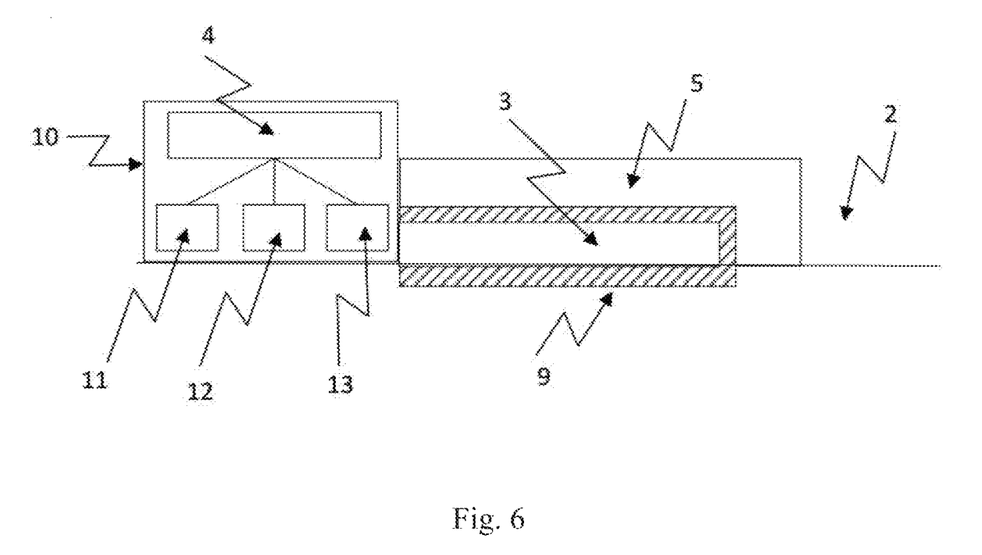
FIG. 6 discloses a schematic cross sectional view of an inside door handle and part of a door of a vehicle according to the invention.
Figure 7:
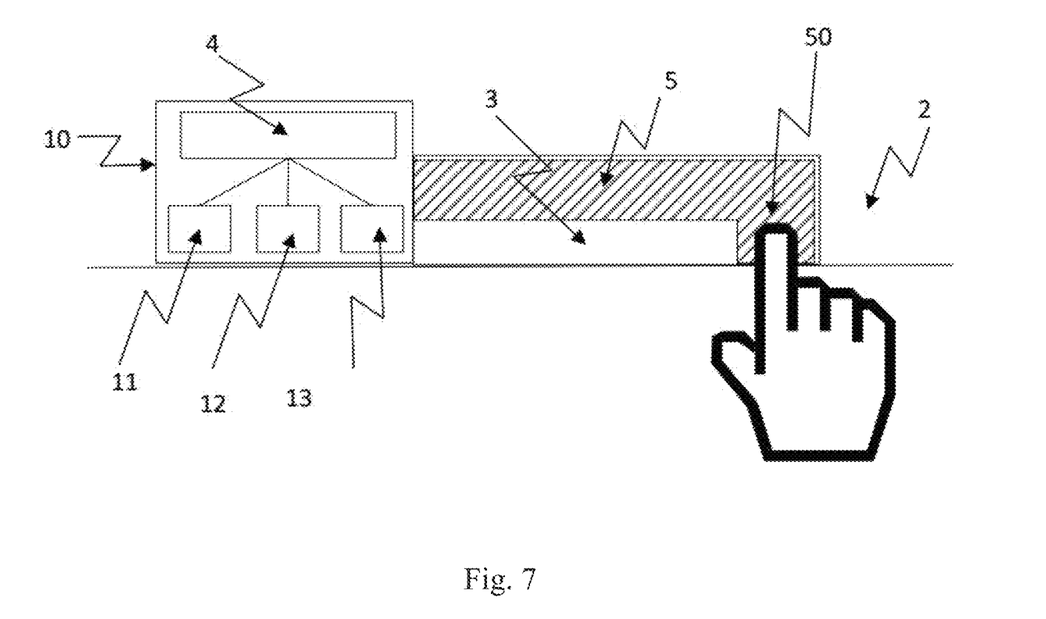
FIG. 7 discloses a schematic cross sectional view of an inside door handle and part of a door of a vehicle according to the invention and a part of a user inside a cavity.

The touch sensor 13 configured to detect if the user touch the inside door handle 3, as disclosed in FIG. 6. The touch sensor 13 detect if a user is within an area 9 at the inside door handle 3 or touch the inside door handle 3. The area 9 is smaller than the opening area 40. According to an aspect the touch sensor 13 is one or more of a camera, a capacitive sensor or a receptive sensor. According to an aspect the touchless sensor 12 and the touch sensor 13 is a combined sensor that is configured to detect if a part 50 of a user is in the opening zone 40 and if the user touches the inside door handle 3.

The control unit 4 is connected to the at least one object sensor 11, the touchless sensor 12 and the touch sensor 13. According to an aspect the control unit 4 is connected to at least one lamp 60 of the vehicle 1, as disclosed in FIG. 4. According to an aspect the control unit 4 is connected to at least one speaker 70 of the vehicle. According to an aspect the control unit 4 is connected to a vibration unit of the vehicle 1. According to an aspect the control unit 4 is connected to a heads up display of the vehicle. According to an aspect the control unit 4 is connected to, an electric shock unit of the vehicle 1. According to an aspect the control unit 4 is connected to a lock 80 of the vehicle 1, as disclosed in FIG. 4.

The control unit 4 of the door opening warning system 10 is configured to trigger a first alarm if the object sensor 11 detect an object 20 in the risk zone 30 and the touchless sensor 12 detects a part 50 of the user in the opening zone 40 at the inside door handle 3. The control unit 4 of the door opening warning system 10 is configured to trigger a second alarm if the object sensor 11 detect an object 20 in the risk zone 30 and the touch sensor 13 detects that the user is touching the inside door handle 3.

According to an aspect the control unit 4 is configured to turn on or flash the lamp 60 if the first alarm is triggered and turn on or flash the lamp 60 in a more intense way if the second alarm is triggered. According to an aspect the at least one lamp 60 is positioned at the inside door handle 3, in the inside door handle 3, at a door post 7, at a post, at a rear view mirror, at a side mirror and/or at a ceiling lamp of the vehicle 1.

According to an aspect the control unit 4 is configured to emit a sound via the speaker 70 if the first alarm is triggered and to emit a more intense sound if the second alarm is triggered. According to an aspect the at least one speaker 70 is a speaker of a hifi-system of the vehicle 1.

According to an aspect the control unit 4 is configured to turn a vibration unit of the vehicle 1 when the first or second alarm is triggered. According to an aspect the vibration unit makes a chair of the vehicle 1 that the user is sitting in vibrating when the first alarm is triggered. According to an aspect the vibration unit makes the chair that the user is sitting in vibrating more intense when the second alarm is triggered. According to an aspect the vibration unit makes the inside door handle 3 vibrate when the first and/or second alarm is triggered.

According to an aspect the control unit 4 is configured to turn a heads up display of the vehicle 1 when the first or second alarm is triggered.

According to an aspect the control unit 4 is configured to turn an electric shock unit of the vehicle 1 when the first or second alarm is triggered. According to an aspect the electric shock unit sends an electric shock to the user via the inside door handle 3 in when the second alarm is triggered. This will make the alarm tactile to the user and in some cases it will force the user to remove the hand from the inside door handle 3 and abort the opening of the door 2 and thereby avoid a potential collision. A natural reaction when receiving an electrical shock is often that the part is retracted, and the part 50 of the user will be retracted from the inside door handle 3 as a reaction of the electrical shock.

According to an aspect the control unit 4 is configured to turn on the lock 80 of the vehicle 1 when the first or second alarm is triggered. Hereby is the door opening warning system 10 not only able to inform the user of a potential dangerous situation, but able to prevent the user from opening the door 2 and thereby also prevent a collision.

According to an aspect the control unit 4 is configured to identify different types of objects 20 identified by the object sensor 11. The control unit 4 is configured to regulate the size of the risk zone 30 based on the type of the identified object 20. The control unit 4 according to an aspect identify if the object sensor 11 detects the object 20 in the form of a driving car 20 or a walking person 20, as disclosed in FIG. 1, or a motorcycle 20, as disclosed in FIG. 2, or a bicycle 20, as disclosed in FIG. 3. According to an aspect the control unit 4 is configured to apply a smaller risk zone 30 if the bicycle is detected by the object sensor 11 than if the car is detected by the object sensor 11. The risk of that a bicycle 20 that is 100 m behind the vehicle 1 collide with the door 2 in the open position O is lower than the risk of the motorcycle 20 or car 20 is 100 m behind the vehicle 1 due to the different speeds that the object are able to travel in. According to an aspect the control unit 4 is configured to apply a smaller risk zone 30 if the person walking 20 is detected by the object sensor 11 than if the bicycle 20 is detected by the object sensor 11. By adapting the size of the risk zone 30 the door opening warning system 10 is able to set off the alarm only when there is an actual risk of a collision.

According to an aspect the control unit 4 is configured to identify the speed that the objects 20 identified by the object sensor 11 are traveling in. The control unit 4 is according to an aspect configured to regulate the size of the risk zone 30 based on the speed of the identified object 20.

According to an aspect the control unit 4 is configured to identify the direction that the objects 20 identified by the object sensor 11 are traveling in. The control unit 4 is according to an aspect configured to regulate the size of the risk zone 30 based on the direction of the identified object 20.

Figure 9:
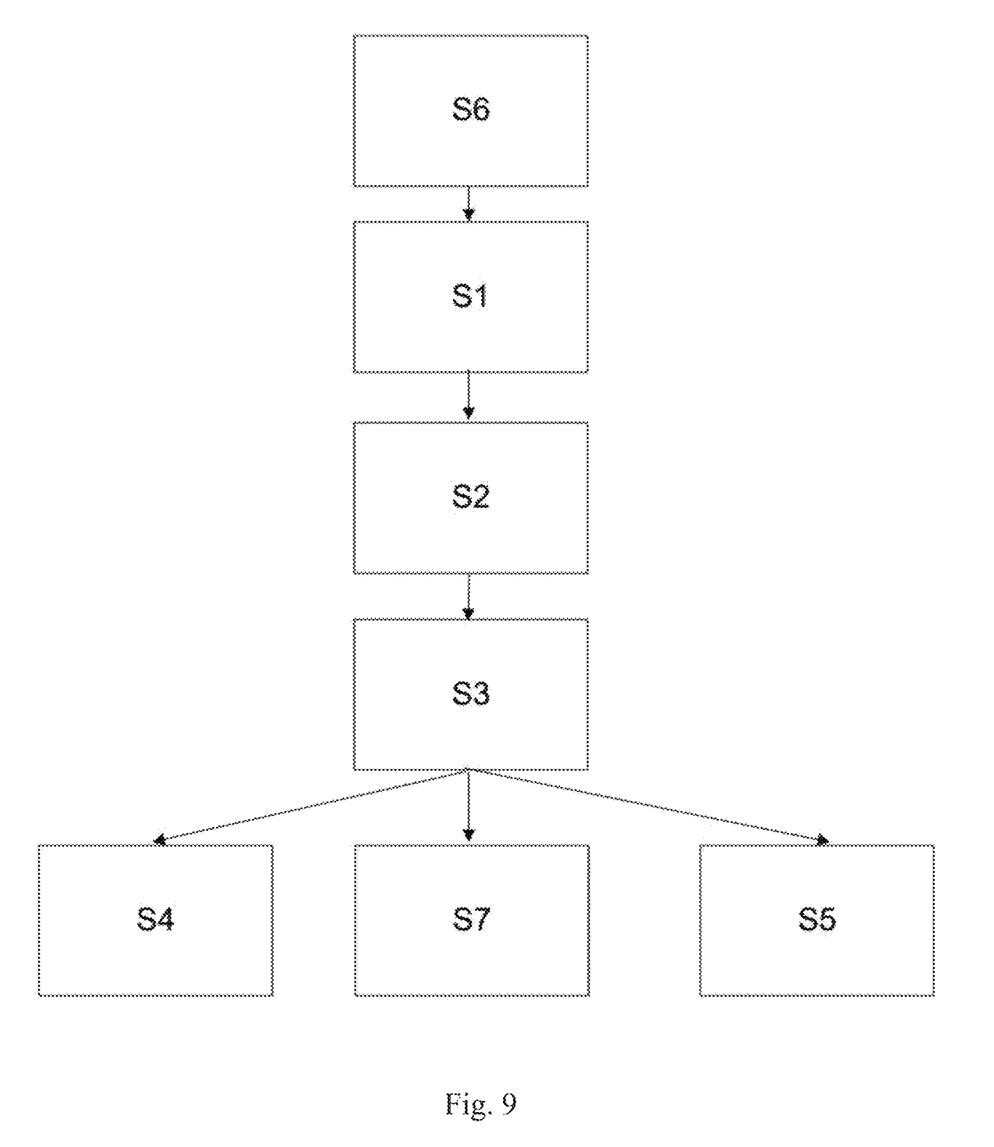
FIG. 9 discloses flow chart of a method according to the invention.

Hereafter a method of operating the vehicle 1 according to the above will be described in more detail. The method comprising the steps of S1 detecting, by the object sensor 11, if an object 20 is in the risk zone 30, S2 detecting, by the touchless sensor 12, if a part of a user is in the opening zone 40 at the inside door handle 3 and S3 detecting, by the touch sensor 13, if the user is touching the inside door handle 3. The method further comprise the steps of S4 triggering a first alarm, if the object sensor 11 detect an object 20 in the risk zone 30 and the touchless sensor 12 detects that the a part 50 of the user is in the opening zone 40 at the inside door handle 3, and S5 triggering a second alarm if the object sensor 11 detect an object 20 in the risk zone 30 and the touch sensor 13 detects that the user is touching the inside door handle 3.

According to an aspect the method further comprise that the door opening warning system 10 is S6 activated when the vehicle 1 has stopped moving.

According to an aspect the method further comprise the door opening warning system 10 is S7 deactivated after a predefined period of time after the vehicle 1 has stopped moving.

According to an aspect the control unit of the door opening warning system 10 is configured to trigger a third alarm if the object sensor 11 detect an object 20 in the risk zone 30 and the inside door handle 3 is moved.

According to an aspect the third alarm comprises locking the door such that it cannot be moved into the risk zone. According to an aspect the third alarm comprise to turn on one or more of a vibration unit, a heads up display and an electric shock unit when the third alarm is triggered.

Although the invention has been described in relation to specific combinations of components, it should be readily appreciated that the components may be combined in other configurations as well which is clear for the skilled person when studying the present application. Thus, the above description of the example embodiments of the present invention and the accompanying drawings are to be regarded as a non-limiting example of the invention and the scope of protection is defined by the appended claims. Any reference sign in the claims should not be construed as limiting the scope.

The person skilled in the art realizes that the present invention by no means is limited to the preferred embodiments described above. On the contrary, many modifications and variations are possible within the scope of the appended claims.

The description of the aspects of the disclosure provided herein has been presented for purposes of illustration. The description is not intended to be exhaustive or to limit aspects of the disclosure to the precise form disclosed, and modifications and variations are possible in light of the above teachings or may be acquired from practice of various alternatives to the provided aspects of the disclosure. The examples discussed herein were chosen and described in order to explain the principles and the nature of various aspects of the disclosure and its practical application to enable one skilled in the art to utilize the aspects of the disclosure in various manners and with various modifications as are suited to the particular use contemplated. The features of the aspects of the disclosure described herein may be combined in all possible combinations of methods, apparatus, modules, systems, and computer program products. It should be appreciated that the aspects of the disclosure presented herein may be practiced in any combination with each other.

It should be noted that the word "comprising" does not necessarily exclude the presence of other elements or steps than those listed. It should further be noted that any reference signs do not limit the scope of the claims.

What is claimed is:

1. A vehicle, comprising:
   a door, the door moveable between an open position and a closed position, and comprising at least one inside door handle for opening the door, and
   a door opening warning system comprising at least one object sensor configured to detect an object outside the vehicle in a risk zone in which there is a risk of the object colliding with the door if the door is moved from the closed position to the open position, a touchless sensor configured to detect a part of a user positioned within a predetermined opening zone adjacent the inside door handle, a touch sensor configured to detect that the user touches the inside door handle, and a control unit connected to the at least one object sensor, the touchless sensor and the touch sensor,
   wherein the control unit of the door opening warning system is configured to:
   a) determine a type of the object detected by the object sensor and regulate a size of the risk zone accordingly to the determined type of the detected object,
   b) trigger a first alarm if the object sensor detects the object in the size-regulated risk zone and the touchless sensor detects the part of the user within the predetermined opening zone adjacent the inside door handle, and
   c) trigger a second alarm if the object sensor detects the object in the size-regulated risk zone and the touch sensor detects that the user is touching the inside door handle.

2. The vehicle according to claim 1, wherein the control unit is connected to at least one lamp and configured to turn on or flash the lamp if the first alarm is triggered and turn on or flash the lamp in a more intense way if the second alarm is triggered.

3. The vehicle according to claim 2, wherein the at least one lamp is positioned at at least one of the inside door handle, the inside door handle, a doorpost, a post, a rear view mirror, a side mirror or a ceiling lamp of the vehicle.

4. The vehicle according to claim 1, wherein the control unit is connected to at least one speaker and configured to emit a sound via the speaker if the first alarm is triggered and to emit a more intense sound if the second alarm is triggered.

5. The vehicle according to claim 1, wherein the control unit is connected to and configured to turn on one or more of a vibration unit, a heads up display, an electric shock unit or a lock of the vehicle when at least one of the first alarm or the second alarm is triggered.

6. The vehicle according to claim 1, wherein the door opening warning system is configured to be in an active state when the vehicle is standing still and in a deactivated state when the vehicle is moving.

7. The vehicle according to claim 1, wherein the door opening warning system is configured to be in the active state for a predefined period of time after at least one of the vehicle has stopped moving or the vehicle has been turned off.

8. The vehicle according to claim 1, wherein the inside door handle is positioned at a cavity and the touchless sensor is configured to detect if a part of the user is inserted into the cavity.

9. The vehicle according to claim 1, wherein the touchless sensor is one or more of a camera, a radar, a IR sensor, a ultrasonic sensor or a laser.

10. The vehicle according to claim 1, wherein the touch sensor is one or more of a camera, a capacitive sensor or a receptive sensor.

11. The vehicle according to claim 1, wherein the object sensor is one or more of a camera, radar, IR-sensor, a ultrasonic sensor and a laser.

12. The vehicle according to claim 1, wherein the at least one speaker is a speaker of a hi-fi-system of the vehicle.

13. The vehicle according to claim 1, wherein the risk zone at least is the area on the outside of the vehicle above which the door moves from its open and closed position.

14. The vehicle according to claim 1, wherein the risk zone at least is the area on the outside of the vehicle at an area behind the vehicle.

15. The vehicle according to claim 1, wherein the predetermined opening zone extends from the inside door handle a distance in the range of 5 cm to 20 cm.

16. A method for operating the vehicle, the vehicle having a door, the door moveable between an open position and a closed position, at least one inside door handle for opening the door, and a door opening warning system including at least one object sensor configured to detect an object outside the vehicle in a risk zone in which there is a risk of the object colliding with the door if the door is moved from the closed position to the open position, a touchless sensor configured to detect a part of a user positioned within a predetermined opening zone adjacent the inside door handle, a touch sensor configured to detect that the user touches the inside door handle, and a control unit connected to the at least one object sensor, the touchless sensor and the touch sensor, the method comprising the steps of:

- detecting, by the object sensor, that the object is in the risk zone, determining the type of the object detected by the object sensor and regulating the size of the risk zone according to the determined type of the identified object,
- detecting, by the touchless sensor, that a part of the user is within the predetermined opening zone adjacent the inside door handle and, in response, triggering a first alarm, and
- detecting, by the touch sensor, that the user is touching the inside door handle and, in response, triggering a second alarm.

17. The method according to claim 16, wherein the door opening warning system is activated when the vehicle has stopped moving.

18. The method according to claim 16, the wherein the door opening warning system is deactivated after a predefined period of time after the vehicle has stopped moving.

\* \* \* \* \*